(12) United States Patent
Lin

(10) Patent No.: US 9,259,966 B2
(45) Date of Patent: Feb. 16, 2016

(54) ADJUSTABLE QUICK RELEASE GRIP

(71) Applicant: Chang Hui Lin, Changhu (TW)

(72) Inventor: Chang Hui Lin, Changhu (TW)

( * ) Notice: Subject to any disclaimer, the term of this patent is extended or adjusted under 35 U.S.C. 154(b) by 157 days.

(21) Appl. No.: 14/222,700

(22) Filed: Mar. 24, 2014

(65) Prior Publication Data
US 2015/0266341 A1    Sep. 24, 2015

(51) Int. Cl.
*B60B 35/00* (2006.01)
*B60B 27/02* (2006.01)
*B62K 25/02* (2006.01)

(52) U.S. Cl.
CPC ............. *B60B 27/026* (2013.01); *B62K 25/02* (2013.01); *B62K 2206/00* (2013.01)

(58) Field of Classification Search
CPC .. B60B 27/026; B60B 35/00; B62K 2206/00; B62K 2206/27026
See application file for complete search history.

(56) References Cited

U.S. PATENT DOCUMENTS

| | | | | |
|---|---|---|---|---|
| 5,291,763 A * | 3/1994 | Cuisinot | ................ | B62H 5/001 301/110.5 |
| 5,653,512 A * | 8/1997 | Phillips | ................. | B60B 27/023 301/110.5 |
| 5,865,560 A * | 2/1999 | Mercat | ................... | B62K 25/02 301/124.2 |
| 5,961,186 A * | 10/1999 | Phillips | ................... | B62K 25/02 301/110.5 |
| 6,260,931 B1 * | 7/2001 | Stewart | ............... | B60B 27/0078 301/110.5 |
| 6,454,363 B1 * | 9/2002 | Vignocchi | .............. | B62K 25/02 301/110.5 |
| 7,648,211 B2 * | 1/2010 | Watarai | ............... | B60B 27/0052 301/110.5 |
| 7,654,548 B2 * | 2/2010 | Kanehisa | ............... | B62K 21/02 280/260 |

* cited by examiner

*Primary Examiner* — John Walters
*Assistant Examiner* — James Triggs
(74) *Attorney, Agent, or Firm* — Alan D. Kamrath; Kamrath IP Lawfirm, P.A.

(57) ABSTRACT

An adjustable quick release grip contains: a handlebar, a central shaft, a quick releasing shaft, a plurality of steel balls, plural springs, a returning spring, an adjusting seat, and a screw nut. The handlebar includes a spherical knob, a groove, an eccentric hole, a pulling lever, and a connecting stem. The quick releasing shaft includes a hollow body with an outer screwing section, and the hollow body has a slot, an aperture, a stopping rim, an opening, a retaining head, and a shoulder, wherein the retaining head has a plurality of receiving holes. The adjusting seat includes an adjustment cover, a first forcing ring, a second forcing ring, a pore, a notch, and a circular gasket, the notch has inner threads arranged around an inner wall thereof, wherein the adjustment cover has an external screw section surround around a bottom end thereof and screwed with the inner threads.

6 Claims, 6 Drawing Sheets

ADJUSTABLE QUICK RELEASE GRIP

FIELD OF THE INVENTION

The present invention relates to an adjustable quick release grip in which an external screw section of an adjustment cover is screwed with or unscrewed from inner threads of a notch to adjustably pull a handlebar easily and quickly.

BACKGROUND OF THE INVENTION

A conventional quick release grip is fixed on a front fork or a rear fork of a bicycle, so in operation, a pulling lever is pushed and is linearly aligned with a quick releasing shaft, and then a handlebar is rotated to drive the quick releasing shaft to force a screw nut. Thereafter, the pulling lever is pushed to retain with the quick releasing shaft at an angle, but the pulling lever is stopped by the front fork or the rear fork, it cannot therefore retain with the quick releasing shaft at the angle, and then the pulling lever is pushed and is linearly aligned with the quick releasing shaft so as to rotate the quick releasing shaft, such that the pulling lever is not stopped by the front fork or the rear fork so that it is pushed tightly to retain with the quick releasing shaft. However, the quick releasing shaft cannot retain with the pulling lever fixedly.

The present invention has arisen to mitigate and/or obviate the afore-described disadvantages.

SUMMARY OF THE INVENTION

One aspect of the present invention is to provide an adjustable quick release grip which is capable of overcoming the shortcomings of the conventional adjustable quick release grip.

To obtain the above, an adjustable quick release grip of the present invention contains: a handlebar, a central shaft, a quick releasing shaft, a plurality of steel balls, plural springs, a returning spring, an adjusting seat, and a screw nut.

The handlebar is rotated and pulled outwardly and includes a spherical knob disposed on a front end thereof, a groove communicating with a middle section of the spherical knob, an eccentric hole defined on a peripheral side of the spherical knob and communicating with the groove, a pulling lever extending outwardly from a bottom end of the spherical knob, a connecting stem inserted into the eccentric hole and having a threaded orifice, the central shaft includes a column mounted on a front end thereof, the column has outer threads surrounding around a front end thereof and screwing with the threaded orifice of the connecting stem, a first shoulder formed around a middle section thereof, and a tab arranged around a rear end thereof, the first shoulder has a plurality of recesses defined around a peripheral side thereof.

The quick releasing shaft includes a hollow body which has an outer screwing section arranged around a rear end of the hollow body and screwing with the screw nut, the hollow body has a slot defined on a central portion thereof and used to insert the quick releasing shaft, and an aperture formed on a front end of the slot, wherein a stopping rim is arranged on a connecting portion of the slot and the aperture, the hollow body further includes an opening arranged in a front end thereof, a retaining head defined around an outer wall of the front end thereof, a second shoulder formed on a connecting portion of the hollow body and the retaining head, wherein the retaining head has a plurality of receiving holes formed around an outer peripheral side thereof, communicating with the aperture, and used to accommodate the plurality of steel balls and the plural springs, the returning spring is fixed between the tab and the stopping rim, the adjusting seat is retained on the second shoulder of the retaining head.

The adjusting seat includes an adjustment cover, a first forcing ring, and a second forcing ring which are secured on a front end of the adjustment seat, the adjusting seat also includes a pore defined on a central position thereof, a notch formed on a central position of a front end thereof, a circular gasket mounted in the notch, the notch has inner threads arranged around an inner wall thereof, wherein the adjustment cover has an external screw section surround around a bottom end thereof and screwed with the inner threads.

Accordingly, the pulling lever is rotated so that it is not stopped by the front fork or the rear fork, and the quick release shaft is engaged with the screw nut securely. Furthermore, the external screw section of the adjustment cover is screwed with or unscrewed from the inner threads of the notch, thus adjustably pulling the handlebar.

DETAILED DESCRIPTION OF THE PREFERRED EMBODIMENTS

Figure 1:
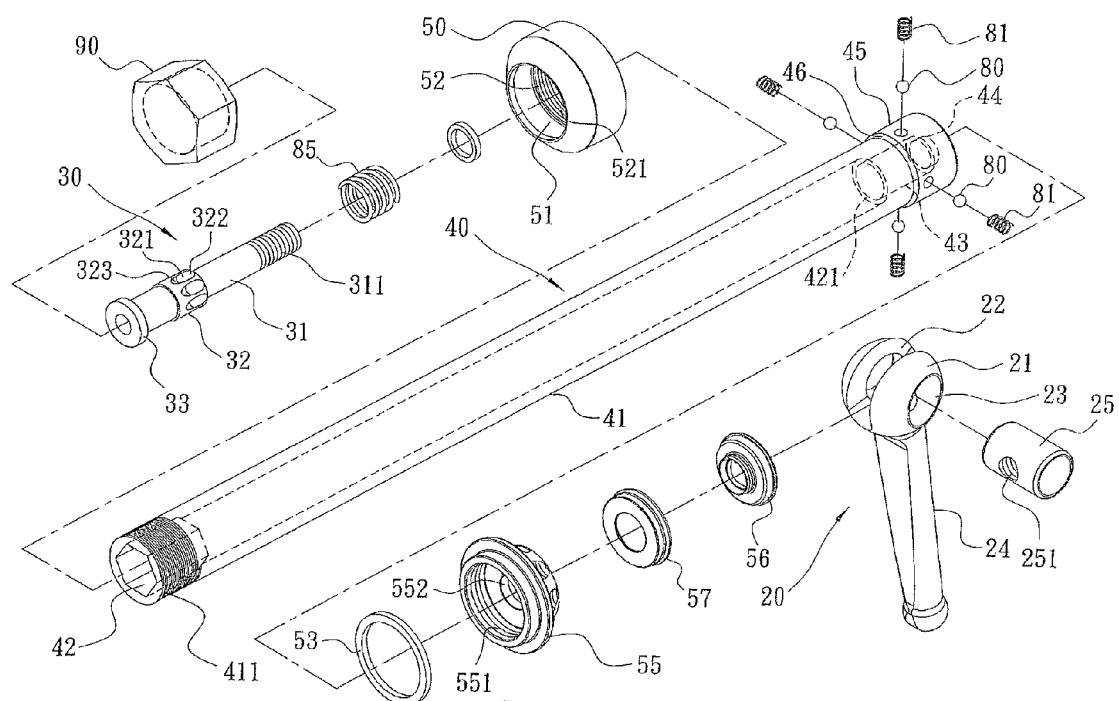
FIG. 1 is a perspective view showing the exploded components of an adjustable quick release grip according to a preferred embodiment of the present invention.
Figure 2:
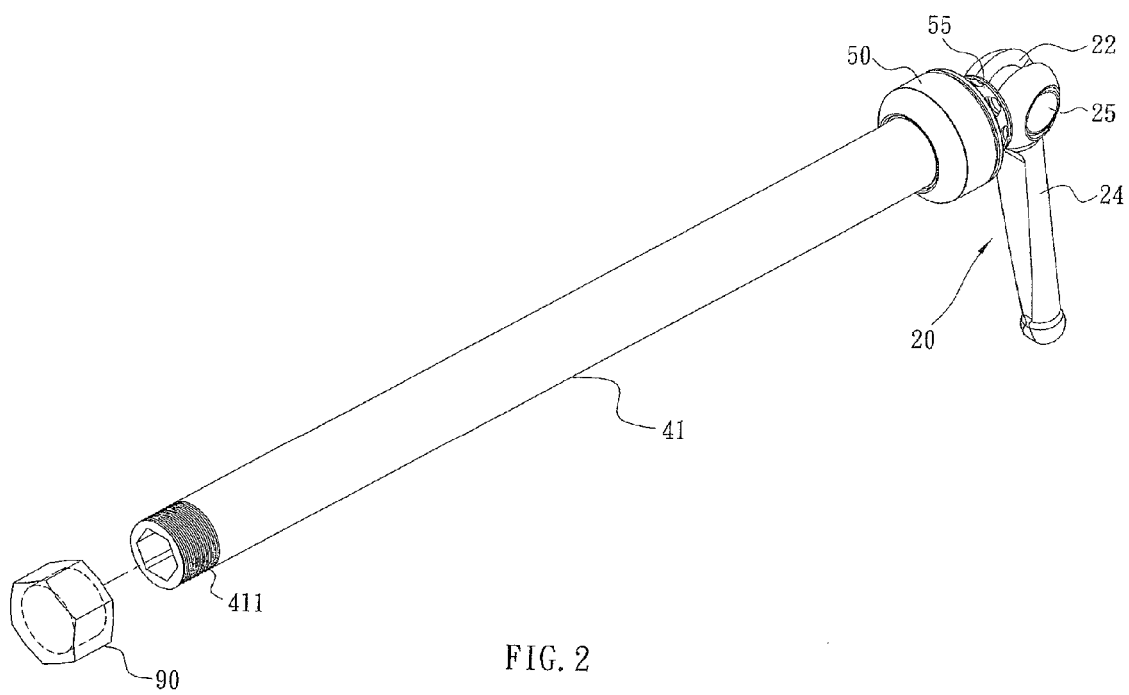
FIG. 2 is a perspective view showing the assembly of the adjustable quick release grip according to the preferred embodiment of the present invention.
Figure 3:
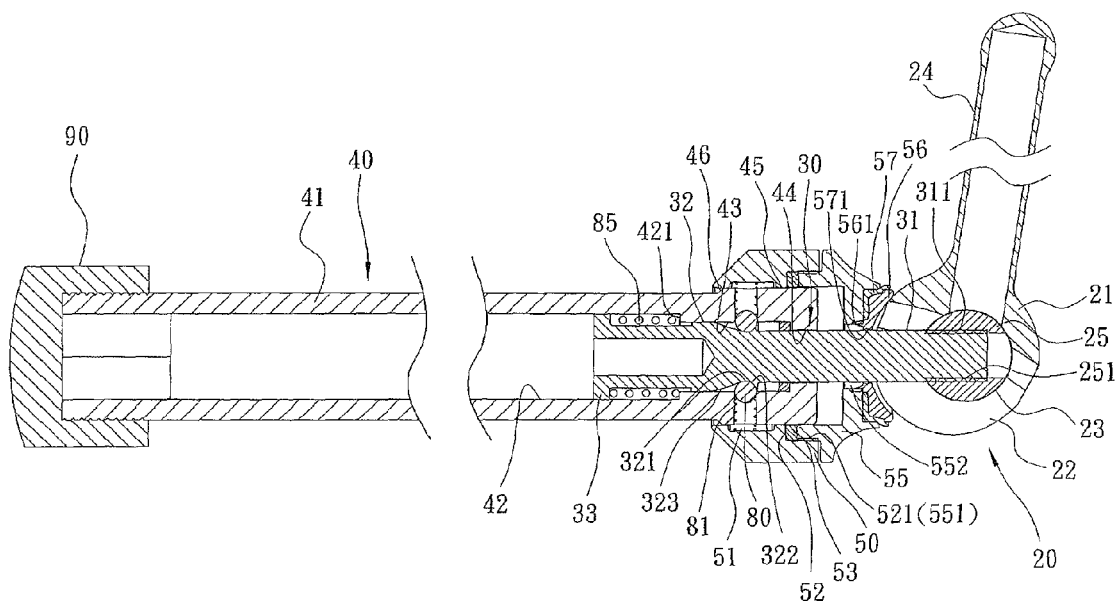
FIG. 3 is a cross sectional view showing the assembly of the adjustable quick release grip according to the preferred embodiment of the present invention.

With reference to FIGS. 1 to 6, an adjustable quick release grip according to a preferred embodiment of the present invention comprises a handlebar 20, a central shaft 30, a quick releasing shaft 40, a plurality of steel balls 80, plural springs 81, a returning spring 85, an adjusting seat 50, and a screw nut 90. The handlebar 20 is rotated and pulled outwardly and includes a spherical knob 21 disposed on a front end thereof, a groove 22 communicating with a middle section of the spherical knob 21, an eccentric hole 23 defined on a peripheral side of the spherical knob 21 and communicating with the groove 22, a pulling lever 24 extending outwardly from a bottom end of the spherical knob 21, a connecting stem 25 inserted into the eccentric hole 23 and having a threaded orifice. The central shaft 30 includes a column 31 mounted on a front end thereof, the column 31 has outer threads 311 surrounding around a front end thereof and screwing with the threaded orifice 251 of the connecting stem 25, a first shoulder 32 formed around a middle section thereof, and a tab 33 arranged around a rear end thereof. The first shoulder 32 has a plurality of recesses 321 defined around a peripheral side thereof, and each recess 321 has a deep portion 322 formed on a front end thereof and a shallow portion 323 arranged on a rear end thereof. The quick releasing shaft 40 includes a hollow body 41 which has an outer screwing section 411 arranged around a rear end of the hollow body 41 and screwing with the screw nut 90. The hollow body 41 has a slot 42 defined on a central portion thereof and used to insert the quick releasing shaft 40, and an aperture 43 formed on a front end of the slot 42, wherein a stopping rim 421 is arranged on a connecting portion of the slot 42 and the aperture 43. The hollow body 41 further includes an opening 44 arranged in a front end thereof, a retaining head 45 defined around an outer wall of the front end thereof, a second shoulder 46 formed on a connecting portion of the hollow body 41 and the retaining head 45, wherein the retaining head 45 has a plurality of receiving holes 451 formed around an outer peripheral side thereof, communicating with the aperture 43, and used to accommodate the plurality of steel balls 80 and the plural springs 81. In assembly, the returning spring 85 is fitted on the central shaft 30, the central shaft 30 is inserted into the slot 42 so that the first shoulder 32 of the central shaft 30 is accommodated in the aperture 43, and the column 31 is extended out of the opening 44 and is screwed with the threaded orifice 251 of the connecting stem 25, the returning spring 85 is fixed between the tab 33 and the stopping rim 421, the adjusting seat 50 is retained on the second shoulder 46 of the retaining head 45.

Furthermore, the adjusting seat 50 includes an adjustment cover 55, a first forcing ring 56, and a second forcing ring 57 which are secured on a front end of the adjustment seat 50. The adjusting seat 50 also includes a pore 51 defined on a central position thereof, a notch 52 formed on a central position of a front end thereof, and a circular gasket 53 mounted in the notch 52, the notch 52 has inner threads arranged around an inner wall thereof, wherein the adjustment cover 55 has a first eyelet 552 defined on a central position thereof, the first forcing ring 56 has a second eyelet 561 formed on a central position thereof, and the second forcing ring 57 has a third eyelet 571 formed on a central position thereof, the adjustment cover 55 has an external screw section 551 surround around a bottom end thereof and screwed with the inner threads 521.

Figure 4:
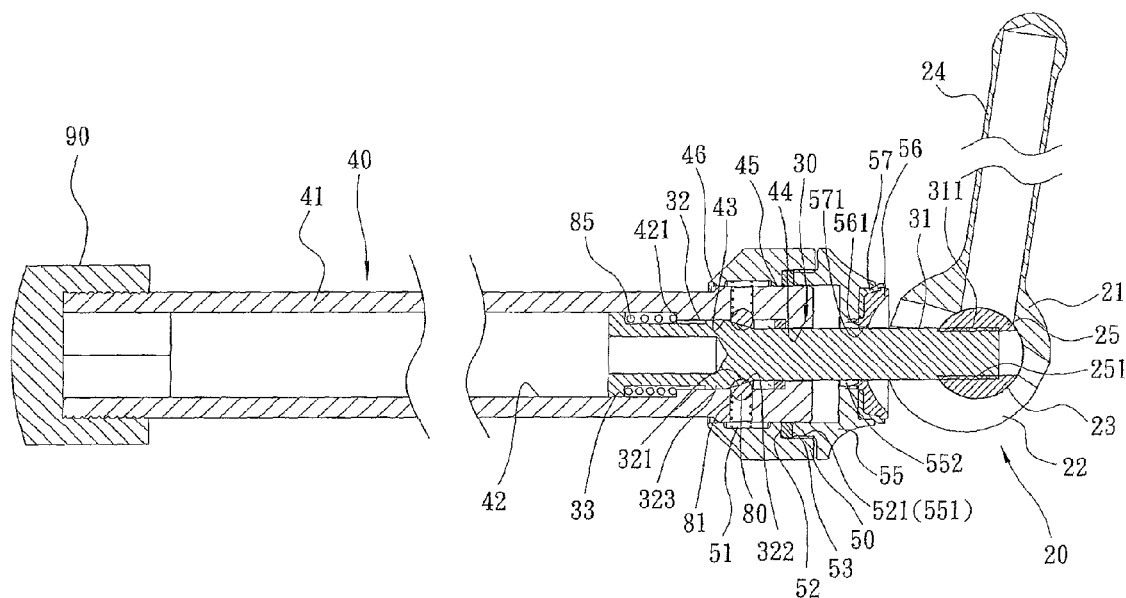
FIG. 4 is a cross sectional view showing the operation of the adjustable quick release grip according to the preferred embodiment of the present invention.
Figure 5:
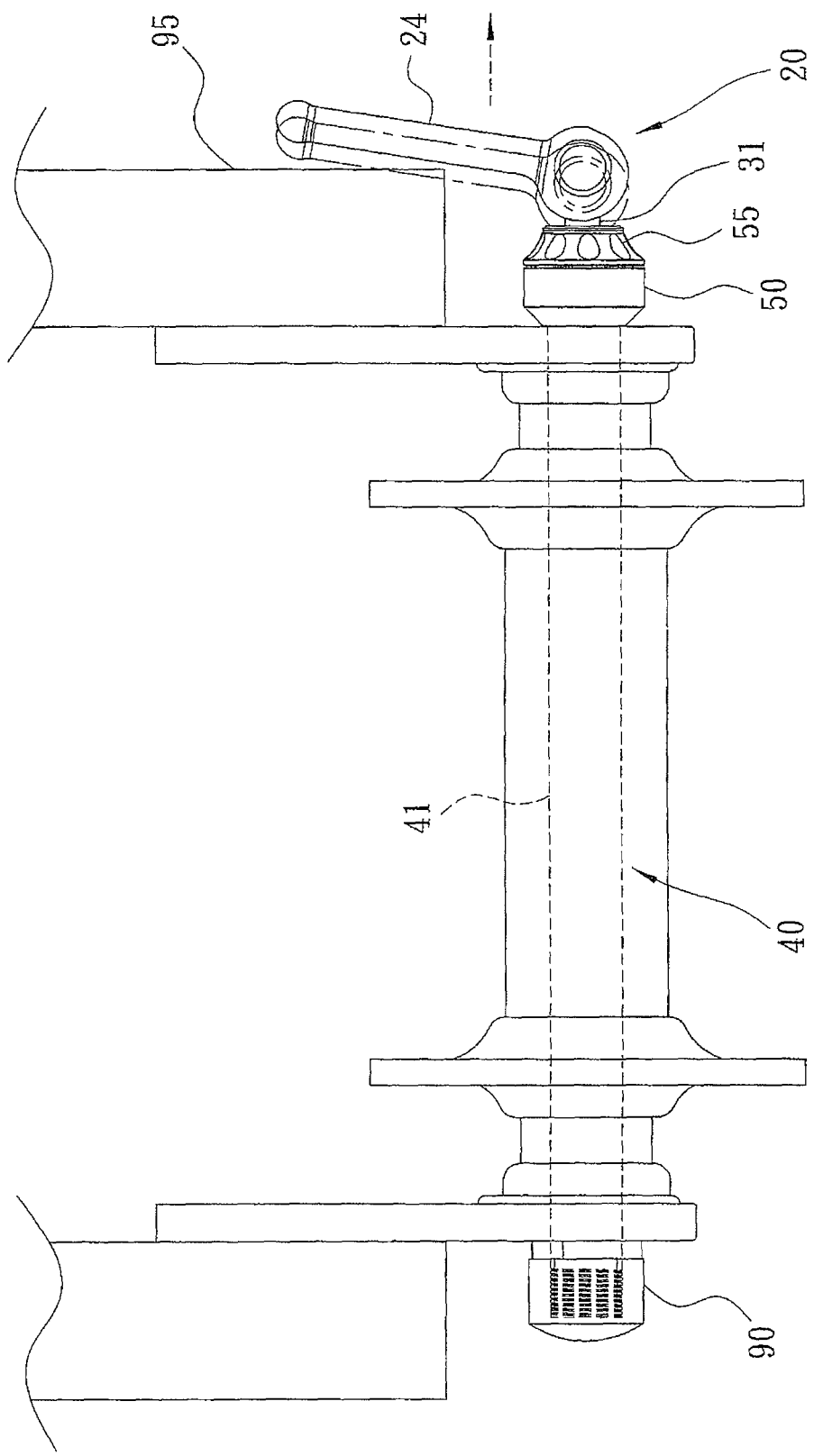
FIG. 5 is a plan view showing the operation of the adjustable quick release grip according to the preferred embodiment of the present invention.
Figure 6:
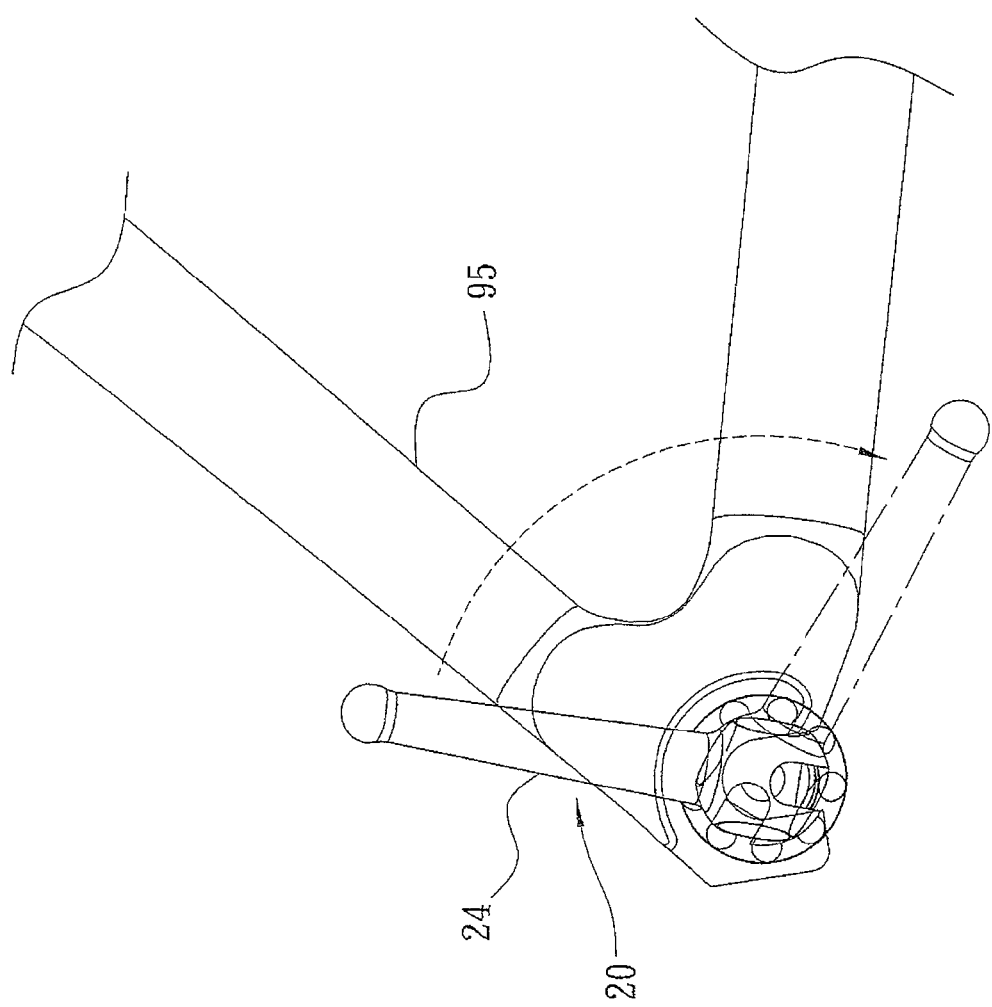
FIG. 6 is another plan view showing the operation of the adjustable quick release grip according to the preferred embodiment of the present invention.

As shown in FIGS. 4 to 6, after the adjustable quick release grip is rotated tightly, the handlebar 20 is rotated to engage with a front fork 95 or a rear fork 96 of a bicycle, so the handlebar 20 cannot be rotated anymore because it is stopped by the front fork 95 or the rear fork 96. Thereafter, the handlebar 20 is pulled outwardly and is adjustably rotated to an angle at which the handlebar 20 is not stopped by the front fork 95 or the rear fork 96, and the handlebar 20 is released so as to be pushed back to an original position by the returning spring 85. After the handlebar 20 is rotated tightly once more, the pulling lever 24 is pulled outwardly to drive the central shaft 30, so the plurality of steel balls 80 move to shallow portions 323 of the plurality of recesses 32 from deep portions 322 of the plurality of recesses 32, and when the pulling lever 24 is rotated, so it is not stopped by the front fork 95 or the rear fork 96, and the plurality of steel balls 80 force the quick releasing shaft 40 to rotate, the pulling lever 24 is pulled outwardly and is rotated to drive the quick releasing shaft 40, thereafter the quick release shaft 40 is engaged with the screw nut 90 securely.

Accordingly, the pulling lever 24 is rotated so that it is not stopped by the front fork 95 or the rear fork 96, and the quick release shaft 40 is engaged with the screw nut 90 securely. Furthermore, the external screw section 551 of the adjustment cover 55 is screwed with or unscrewed from the inner threads 521 of the notch 52, thus adjustably pulling the handlebar 20.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. An adjustable quick release grip comprising:
 a handlebar, a central shaft, a quick releasing shaft, a plurality of steel balls, plural springs, a returning spring, an adjusting seat, and a screw nut;
 the handlebar being rotated and pulled outwardly and including a spherical knob disposed on a front end thereof, a groove communicating with a middle section of the spherical knob, an eccentric hole defined on a peripheral side of the spherical knob and communicating with the groove, a pulling lever extending outwardly from a bottom end of the spherical knob, a connecting stem inserted into the eccentric hole and having a threaded orifice, the central shaft including a column mounted on a front end thereof, the column having outer threads surrounding around a front end thereof and screwing with the threaded orifice of the connecting stem, a first shoulder formed around a middle section thereof, and a tab arranged around a rear end thereof, the first shoulder having a plurality of recesses defined around a peripheral side thereof;
 the quick releasing shaft including a hollow body which has an outer screwing section arranged around a rear end of the hollow body and screwing with the screw nut, the hollow body having a slot defined on a central portion thereof and used to insert the quick releasing shaft, and an aperture formed on a front end of the slot, wherein a stopping rim is arranged on a connecting portion of the slot and the aperture, the hollow body further includes an opening arranged in a front end thereof, a retaining head defined around an outer wall of the front end thereof, a second shoulder formed on a connecting portion of the hollow body and the retaining head, wherein the retaining head has a plurality of receiving holes formed around an outer peripheral side thereof, communicating with the aperture, and used to accommodate the plurality of steel balls and the plural springs, the returning spring is fixed between the tab and the stopping rim, the adjusting seat is retained on the second shoulder of the retaining head;
 the adjusting seat including an adjustment cover, a first forcing ring, and a second forcing ring which are secured on a front end of the adjustment seat, the adjusting seat also including a pore defined on a central position thereof, a notch formed on a central position of a front end thereof, a circular gasket mounted in the notch, the notch having inner threads arranged around an inner wall thereof, wherein the adjustment cover has an external screw section surround around a bottom end thereof and screwed with the inner threads.

2. The adjustable quick release grip as claimed in claim 1, wherein the returning spring is fitted on the central shaft, and the central shaft is inserted into the slot.

3. The adjustable quick release grip as claimed in claim 1, wherein the first shoulder of the central shaft is accommodated in the aperture, and the column is extended out of the opening and is screwed with the threaded orifice of the connecting stem.

4. The adjustable quick release grip as claimed in claim 1, wherein each recess has a deep portion formed on a front end thereof and a shallow portion arranged on a rear end thereof.

5. The adjustable quick release grip as claimed in claim 4, wherein the external screw section of the adjustment cover is screwed with or unscrewed from the inner threads of the notch to adjustably pull the handlebar.

6. The adjustable quick release grip as claimed in claim 5, wherein the adjustment cover has a first eyelet defined on a central position thereof, the first forcing ring has a second eyelet formed on a central position thereof, and the second forcing ring has a third eyelet formed on a central position thereof.

* * * * *